INFRARED IMAGE SYSTEM USING PYROELECTRIC DETECTORS

Filed March 18, 1963 2 Sheets-Sheet 1

INVENTOR.
ROBERT W. ASTHEIMER

BY Joseph Levinson

ATTORNEY

INVENTOR.
ROBERT W. ASTHEIMER
BY Joseph Levinson
ATTORNEY

United States Patent Office 3,256,435

Patented June 14, 1966

3,256,435

INFRARED IMAGE SYSTEM USING PYROELECTRIC DETECTORS

Robert W. Astheimer, Westport, Conn., assignor to Barnes Engineering Company, Stamford, Conn., a corporation of Delaware Filed Mar. 18, 1963, Ser. No. 265,838

4 Claims. (Cl. 250—83.3)

Figures 1, 2:
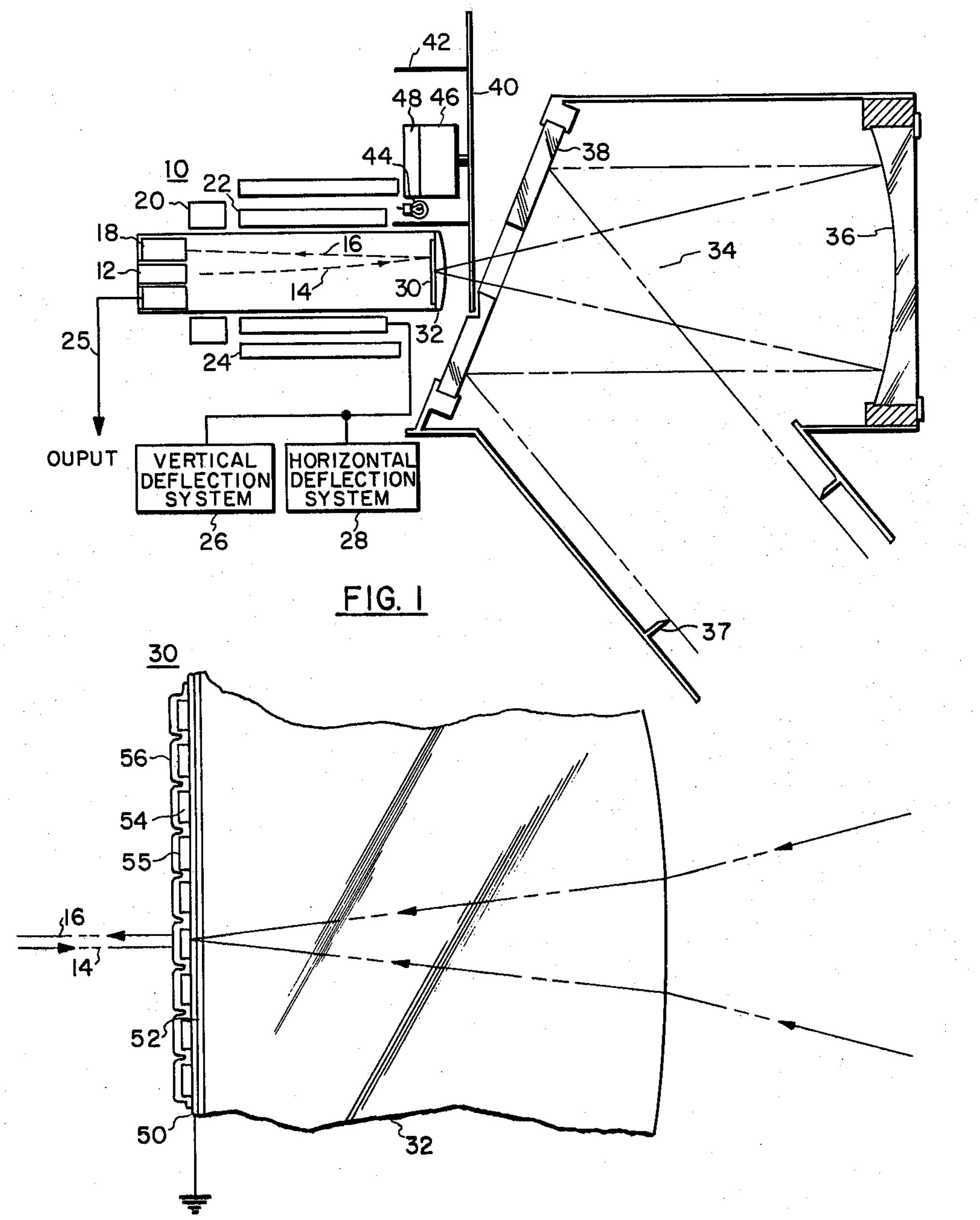

This invention relates to an infrared image system, and more particularly to a system of this character utilizing an infrared image transducer having an array of pyroelectric, thermally sensitive elements which are scanned by a low velocity electron beam.

In an infrared camera of the type shown and described in Patent No. 2,895,049 entitled, "Image Transducer" by R. W. Astheimer et al., a single infrared detector element instantaneously views only a small portion of a field of view to be covered. By external, mechanically driven optical scanning means, the detector is made to scan the entire field of view and its electrical output signals are used to modulate a light source which is scanned over a photographic means in synchronism with the movement of the detector scanning means to record the infrared images. The scanning structure tends to be somewhat complex and bulky, which limits its scanning speed. Furthermore, the scanning speed is limited by the time constant of the detector element. To achieve greater sensitivity it may be necessary to cool the detector to increase its time constant which would severely limit the operational capabilities of such cameras. Of course, the size and bulk of this type of infrared camera would render it unacceptable for space applications.

Elaborate arrays and mosaics of infrared detector elements have also been proposed in which each element continually views the same small elemental portion of a field of view and the mosaics are mechanically scanned by sequentially switching the outputs of the individual elements to electronic amplifying and processing circuitry. Elaborate switching and impedance matching means are required to combat noise problems which greatly reduce the sensitivity and accordingly the reliability of such systems.

Therefore, it is an object of this invention to provide a new and improved infrared image transducer which overcomes some of the disadvantages associated with previously proposed devices for obtaining infrared images.

Another object of this invention is to provide a sensitive, high-speed and high-resolution, long wavelength infrared camera.

It has also been proposed to use an electron beam for high speed sampling of a photoconductive mosaic. This approach has provided little success in the infrared spectral region because the impedance of the photoconductive elements is not sufficiently large to match the impedance of the electron beam readout system and cooling of the photoconductive mosaic is required to obtain some semblance of sensitivity. Furthermore, the spectral range of photoconductive radiation detectors limits their use to the near infrared.

It is a further object of this invention to provide an electron beam sampling of infrared detectors in which the impedance of the detectors more nearly matches the impedance of the electron beam sampling system to overcome the aforesaid difficulty by increasing sensitivity without cooling the detector array.

In carrying out this invention in one illustrative embodiment thereof, a conventional orthicon tube having an electron gun for producing a low velocity electron beam and an electron multiplier on one end of the tube, and a target plate on the other end thereof, is modified by providing on the target plate with an array or mosaic of pyroelectric radiation detectors. Optical means are provided for imaging a field of view on the pyroelectric radiation detector array to place a charge on the detector array in accordance with the radiation received from the field of view. Conventional orthicon scanning means are provided for scanning the electron beam over the detector array for neutralizing the charge on the detectors due to the radiation of the field of view, whereby the electron beam is modulated by the charge appearing thereon, and returned to the electron multiplier means, which amplifies the modulated electron beam. In order to provide continuous surface charge in accordance with the radiation received from the field of view, a chopper means is provided for removal of the incident radiation from the detector elements which causes the crystal temperature to revert to that of the chopper blade. Means are also provided for shorting out or neutralizing any charge placed on the detectors by the chopper means for reverting the pyroelectric radiation detector to its original condition, so that re-exposure of the pyroelectric radiation detector to incident radiation again builds up a charge on the detector so that repeated read-outs can be obtained.

Figure 3:
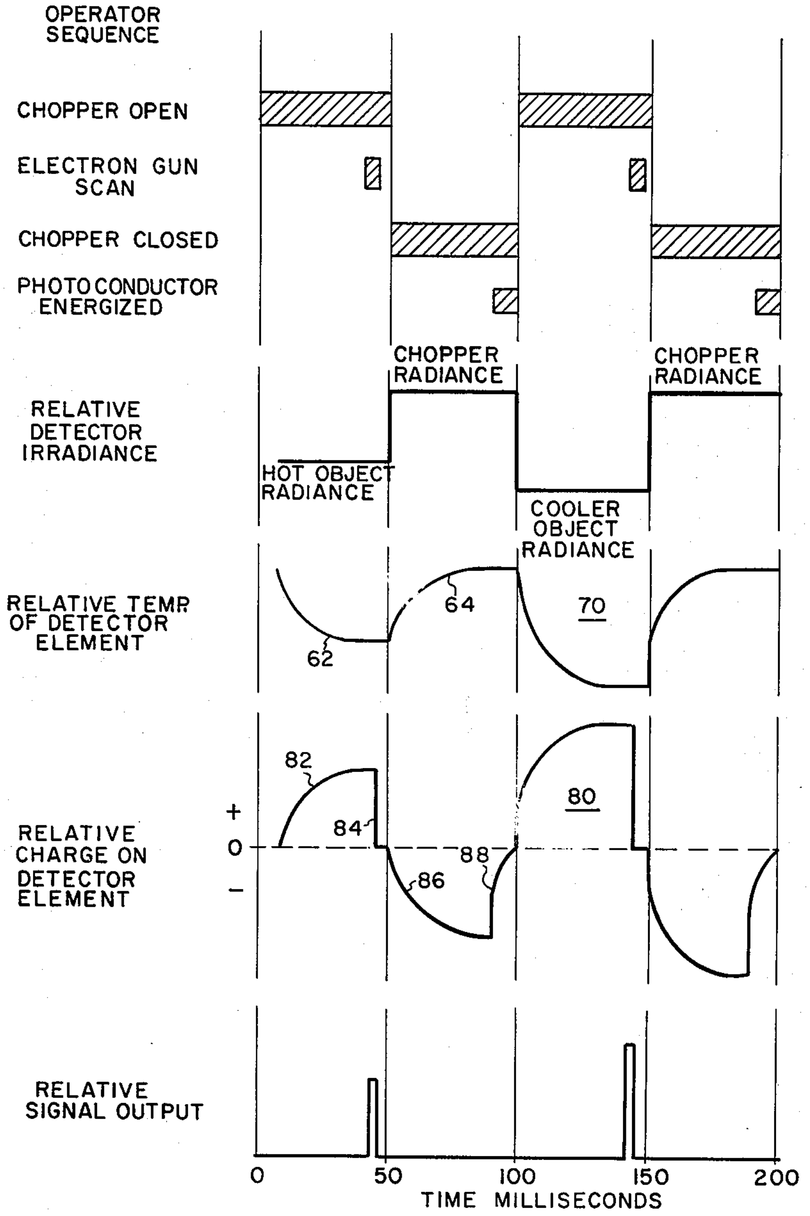

The invention, both as to organization and method of operation, together with further objects and advantages thereof, may best be understood by reference to the following description taken in connection with the accompanying drawings, in which:

FIG. 1 is a schematic diagram of the infrared imaging system embodied in this invention, FIG. 2 is an enlarged, exaggerated cross-sectional view of a portion of one type of target plate which may be utilized in the infrared imaging system shown in FIG. 1, and FIG. 3 illustrates the sequence of operation and signal derivation in graphic form of the infrared imaging system embodied in this invention.

The term pyroelectric detector as used hereinafter includes detectors made up of crystals which show spontaneous electrical polarization even in the absence of an applied electric field. Electric polarization is not observed under static conditions (no temperature change) because the polarization charge on the crystal faces or in the crystal interior is compensated for by free electric charge. There is, however, a change of polarization when a pyroelectric material is either heated or cooled. Accordingly, if opposite faces of a pyroelectric crystal are connected electrically to external circuitry immediately after a change in temperature, a current will flow. The polarity of this current depends on the sense of the temperature change, and in the absence of electrical connections thereto the surface charges are eventually neutralized by leakage. Increasing the temperature causes the polarization to decrease and become zero at a temperature known as the Curie point. Ferroelectric crystals are pyroelectrics showing the spontaneous polarization as described, but have the additional property that the polarization can be reversed in sense by an applied field. This is not true in the case of non-ferroelectric pyroelectric materials. One of the better known, and most extensively investigated ferroelectric materials which is pyroelectric is barium titanate, which is the pyroelectric preferred for use in this invention. The invention, however, is not limited to the use of barium titanate, and the invention applies to use of other crystalline structures which exhibit the characteristics of pyroelectrics.

The change in spontaneous polarization resulting from a small change of temperature of a barium titanate crystal, when illuminized by an infrared source, is utilized in the infrared image system of the present invention. An entire array or mosaic of pyroelectric crystals formed into detector elements have imaged thereon, by an optical means, a field of view. The change in temperature detected by the pyroelectric crystals is used to modulate an electron beam of the low-velocity type as generated in an orthicon tube, to modulate the beam in accordance with the radiation received on the detector to provide an infrared, or heat picture of the target scene.

Referring now to FIG. 1, an orthicon tube referred to generally with the reference character 10, has an electron gun 12 for generating a low velocity electron beam 14. Conventional elements of the orthicon tube 10 include an electron multiplier 18 having a lead 25 connected thereto for deriving an output therefrom, a focusing coil 24, an alignment coil 20, and a deflection yoke 22 having a vertical deflection system 26 and a horizontal deflection system 28 connected thereto, which provide a means for scanning the electron beam 14 over a target area. The unconventional portion of the orthicon tube 10 resides in a target plate 30 mounted on a heat sink 32. The target plate 30, which will be explained more hereinafter in connection with FIG. 2, includes a mosaic of pyroelectric radiant detector elements which are scanned by the electron beam 14.

An optical system, referred to generally with the reference numeral 34, includes aperture stops 37 and a Cassegrainian optical system comprised of a plain mirror 38 having a central opening therein, and a parabolic mirror 36. The optical system 34 functions to apply radiation from a field of view outside the aperture stops onto the target 30 of the orthicon tube 10. Positioned in front of the target 30 is a black chopper 40 having fins 42 driven by a chopper drive motor 46 and heated by a chopper heater 48. The chopper 40 functions to alternately apply the field of view and the black heated chopper to the target 30 a predetermined number of times per second for reasons which will be described hereafter in connection with the operation of the system.

One form which the target 30 may take is illustrated in FIG. 2. The target 30 is comprised of a thick infrared transmissive plate or heat sink 32 on which a mosaic of thin pyroelectric elements 54 are supported. The plate 32 is massive with respect to the detector elements 54, and functions both as a support for the target structure as well as a heat sink for these elements, and a means of sealing off the front of the orthicon tube 10. Silicon, germanium, or the like may be utilized for this plate, since both silicon and germanium have high thermal conductivity which provides a good heat sink for the detector elements 54. Good infrared transmittance is provided from 1.8 to 20 microns for germanium and 1.2 to over 40 microns for silicon. A relatively thick thermal insulating layer 52 is mounted directly on the heat sink 32 to provide thermal insulation between the detector elements 54 and the heat sink 32. The thermal conductivity and thickness of layer 52 control the time constant of the detector elements 54. The layer 52 may be a one or two mil film having high thermal insulation and good infrared transmittance, and may be comprised of a polymer film such as polyethylene, or one of several amorphous inorganic glasses, for example, a modified selenium glass. On the layer 52 is provided an electrically conductive thin-film coating 50 which is common to all of the detector elements. The coating 50 provides good electrical conductivity as well as good infrared transmittance. It may be a thin metallic coating of gold or platinum, on the order of 100 A.–300 A. thick, which is deposited on the thermal insulation layer 52. A mosaic of barium titanate infrared detection elements 54 are placed on the coating 50. These elements may be on the order of 2 to 3 mils thick. A detector blacking 55 is applied to the surface of each of the detector elements to enhance the infrared absorption of the detector elements 54. The final coating 56 is a thin film of a suitable photoconductive coating such as antimony trisulphide, which covers the entire detector mosaic. The dark resistance of the photoconductive coating 56 is high, and therefore does not electrically interconnect the detector elements except at such time in the system operation when short pulses of visible light produce photoconductivity to the film, which acts to return all of the detection elements to a reference or zero electrostatic charge condition by electrically shorting the coating 56 to the coating 50.

As will be apparent to those skilled in the art, the target 30 may have other configurations than that specifically described in connection with FIG. 2. Layers of varying thickness may be used for specific application. Also, other layers of material may be interposed in addition to those shown for enhancing the sensitivity of the target to specific wavelengths of infrared energy and/or for increasing the sensitivity of the target 30. Then, too, some of the layers might be dispensed with where greater sensitivity is not desired or necessary. For example, relatively thick detector elements may be mounted directly on the heat sink 32 where, in such a case, the insulation between the detector elements and the heat sink resides in the thickness of the detector elements per se, and the electrical conductivity between the elements is provided through the heat sink.

In operation, the target plate 30 alternately views a field of view which is imaged on the target by the optical system 34, and a black, heated chopper 40. A hot object in the field of view increases the temperature of the corresponding detector elements 54 relative to adjacent detector elements to produce a charge on those elements equivalent to its temperature change in accordance with the radiation received from the hot object. This charge, if not read off, ultimately decays to zero. Therefore, the charge must be read out before it substantially decays. The scanning beam of the orthicon tube 10 is utilized to rapidly read off the amount of positive charge on each detector element before substantial decay begins. As previously set forth herein, the pyroelectric current generation of the detector elements 54 depends on a change in temperature from a given reference level. Accordingly, the temperature of the detector elements 54 must be reset in each frame to a reference temperature and also to a zero charge level. Since the electron beam 14 can read only positive charges, the detector reference temperature must be equivalent to a radiance of either the hottest or coolest object temperature for which the target plate is initially permanently polarized in opposite directions. Since it is easier to heat the chopper 40 than to cool it, a hot chopper is shown, although it will be appreciated that a cold chopper reference may be utilized. Using the hot reference produces a negative picture which can readily be processed electronically to result in a positive picture. FIG. 2 shows the signal derived from one detector element where a different temperature object is inserted in one detector's field of view in successive frames, such as would be the case of a high-speed object moving through the field of view of the optical system 34.

Using a hot chopper and allowing the chopper to open, produces a temperature change on the detector element as shown by portion 62 of curve 70, thereby producing an increasing positive charge 82 on the detector element which soon stabilizes to the temperature of the object in the field of view. The orthicon beam 14 deposits electrons on the detector element equivalent to the positive charge on that element, thus removing the positive charge on the detector element which is represented by portion 84 on curve 80. The resulting modulated return beam 16 is amplified by the photomultiplier 18 providing an amplified output therefrom as in conventional orthicon tubes. When the chopper blade then closes, the relative temperature 64 on each detector element increases, producing a negative charge 86 on the elements, which charge must be removed before the chopper is reopened. Otherwise the charge on the target plate 30 will not go positive, and therefore cannot be read out by the electron beam 14. A luminous source 44, which is continually illuminated, is applied at this point as shown in FIG. 3, to perform this function. The fins 42 on the chopper blade 40 allow the light from the luminous source 44 to energize the photoconductive layer 56 just before the chopper 40 is reopened. This discharges the target plate in a manner shown by portion 88 of curve 80, preparing it for the next frame in the sampling sequence. As again seen in FIG. 3, a cooler object falling on the same element produces a greater temperature differential between the chopper radiance or reference source, producing a greater positive charge on a given detector element, which, when read off by the electron beam, produces a larger signal output. Once sampled by the electron beam, the photoconductor is again activated by the luminous source 44 to discharge the negative charge caused by the temperature difference when the element again sees the chopper. The target is then again ready for another sampling sequence.

During the aforesaid operation, the orthicon tube 10 has a target whose potential fluctuates between an equilibrium condition which occurs when an element is sampled by the scanning beam, and a more positive voltage determined by the charge accumulated on the target elements during exposure to object radiation. The output signal of the orthicon tube 10 is directly proportional to this potential difference at the target. Further, the return beam 16, which enters the electron multiplier 18, is applied to external circuitry after practically noiseless amplification by the photomultiplier 18.

The infrared image system which has been described offers a high-sensitivity, high-speed system. This sensitivity and speed are obtained without cooling the detector elements. By utilizing high-speed electronic scanning, better resolution is obtainable than in previous systems for obtaining infrared image pictures. Sensitivity is greatly increased by using pyroelectric elements whose impedance is large, to better match the high impedance of the electron beam scanning arrangement.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. An infrared image system comprising, in combination, (a) an image device having an electron gun for producing a low velocity electron beam and an electron multiplier means in one end thereof and a target plate on the other end thereof, (b) an array of pyroelectric radiation detectors mounted on said target plate, (c) optical means for imaging a field of view on said array of pyroelectric detectors, (d) chopper means for periodically chopping the radiation applied from said field of view to said pyroelectric detectors, said detectors being charged in accordance with the radiation received from said field of view, (e) means for scanning said electron beam over said detectors for neutralizing the charge on said detectors due to the radiation from said field of view, said electron beam being modulated by said charge and returned to said electron multiplier means which amplifies said electron beam, (f) a layer of photoconductive material covering said array of pyroelectric radiation detectors, and (g) means for illuminating said layer before said chopper allows the field of view to be imaged on said detectors for neutralizing any charge placed on said detectors by said chopper means.

2. The infrared image system set forth in claim 1 wherein said target plate includes a heat sink, an electrically conductive layer in electrical contact with each of said detector elements, a thermal insulating layer, said detectors being mounted on a side opposite said layer of photoconductive material on said heat sink with said thermal insulating layer being interposed between said electrically conductive layer and said heat sink.

3. An infrared image system comprising, in combination, (a) a low velocity electron beam orthicon device having a target comprised of an array of pyroelectric radiation detectors, (b) a heat sink of infrared transmissive material, (c) an electrically conductive layer mounted in contact with each of said detector elements, a thermal insulating layer, said radiation detectors being mounted on said heat sink with said insulating layer being interposed between the electrically conductive layer and said heat sink, (d) optical means for imaging a field of view on said array of pyroelectric detectors through said heat sink and said conductive and insulating layers, (e) means for scanning said detectors with the electron beam of said orthicon device on the side of said detectors opposite said heat sink which modulates said beam in accordance with the charge placed on said target by the field of view, (f) means for producing an amplified output of the modified electron beam from said device, (g) chopper means for alternately exposing said target to said field of view and to said chopper means, and (h) means for removing any charge placed on said detectors by said chopper means before said detectors are again exposed to the field of view.

4. The infrared image system set forth in claim 3 wherein said means for removing any charge placed on said detectors by said chopper means is comprised of a layer of photoconductive material covering said array of pyroelectric radiation detectors on a side opposite said heat sink, and means for illuminating said layer of photoconductive material before said chopper allows the field of view to be imaged on said detectors.

References Cited by the Examiner

UNITED STATES PATENTS

| | | | |
|---|---|---|---|
| 2,816,954 | 12/1954 | Huffman | 250—83.3 X |
| 2,879,401 | 3/1959 | Chicurel | 250—83.3 |
| 2,951,175 | 8/1960 | Null | 250—83.3 X |
| 2,986,637 | 5/1961 | Null | 250—83.3 |

RALPH G. NILSON, *Primary Examiner.*

ARCHIE R. BORCHELT, *Examiner.*